United States Patent
Olson (12)

(10) Patent No.: US 6,418,376 B1
(45) Date of Patent: Jul. 9, 2002

(54) METHOD AND APPARATUS TO MAINTAIN COMPASS HEADING WITH A MOVEABLE SENSOR MOUNTING

(75) Inventor: Thomas R. Olson, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/651,521

(22) Filed: Aug. 30, 2000

Related U.S. Application Data

(60) Provisional application No. 60/151,419, filed on Aug. 30, 1999.

(51) Int. Cl.[7] ............................ G08B 23/00; G06F 19/00
(52) U.S. Cl. .......................... 701/224; 701/220; 702/85; 702/92
(58) Field of Search ................................ 701/224, 220; 33/361, 356, 355 R; 73/1.76; 702/85, 92, 93, 95

(56) References Cited

U.S. PATENT DOCUMENTS

| | | | | |
|---|---|---|---|---|
| 4,581,827 A | * | 4/1986 | Higashi ...................... | 33/333 |
| 4,953,305 A | * | 9/1990 | Van Lente et al. ............ | 33/356 |
| 5,090,231 A | * | 2/1992 | Gallagher .................... | 702/92 |
| 5,095,631 A | * | 3/1992 | Gavril et al. ................. | 3/361 |
| 5,737,226 A | * | 4/1998 | Olson et al. .................. | 702/85 |
| 5,761,094 A | * | 6/1998 | Olson et al. .................. | 702/85 |
| 5,878,370 A | | 3/1999 | Olson ......................... | 701/224 |
| 6,023,229 A | | 2/2000 | Bugno et al. ............. | 340/693.5 |
| 6,140,933 A | * | 10/2000 | Bugno et al. ............. | 340/693.5 |
| 6,243,660 B1 | * | 6/2001 | Hsu et al. .................... | 702/160 |

* cited by examiner

Primary Examiner—Tan Nguyen
(74) Attorney, Agent, or Firm—Foley & Lardner

(57) ABSTRACT

An electronic compass system for use in an adjustable fixture in a vehicle such as an automobile including a sensor for detecting a magnetic field and for providing electrical signals representative of the direction of the vehicle with respect to the magnetic field. Relative position sensors provide electronic compass orientation relative to the vehicle. A circuit coupled to said sensing means resolve the direction and relative position electrical signals into a number of data points from which the detected direction of the vehicle may be calculated. The circuit also provides heading output signals representing heading information corresponding to the detected direction. An indicator coupled to the circuit provides an indication of the vehicle heading in response to said heading output signals, where the circuit includes a processor responsive to the direction electrical signals for determining a relative field strength of the magnetic field, for varying the resolution at which the circuit resolves the direction electrical signals into heading information as a function of the detected strength of the magnetic field, and for recalibrating the heading signal in response to sensor orientation signals to maintain accuracy of the indicated heading information. The processing means varies the resolution by adjusting the number of data points into which said direction representative electrical signals can be resolved.

37 Claims, 3 Drawing Sheets

METHOD AND APPARATUS TO MAINTAIN COMPASS HEADING WITH A MOVEABLE SENSOR MOUNTING

CROSS-REFERENCE TO RELATED APPLICATIONS

This application claims the benefit of U.S. Provisional Patent Application No. 60/151,419, filed Aug. 30, 1999.

TECHNICAL FIELD OF THE INVENTION

The present invention relates to an electronic compass. More specifically, the present invention relates to an electronic compass with a moveable sensor.

BACKGROUND

Electronic compasses are commonly used in vehicles as an aid for direction finding and navigation. An electronic compass may be positioned in a vehicle on the instrument panel, the rearview mirror, or at other locations within a vehicle. The positioning of the compass in the interior of a vehicle often determines how the compass is installed and packaged. For example, when an electronic compass is attached to an adjustable rearview mirror, the compass electronics package may be integrated with the mirror, while the magnetic sensors used by the electronic compass are normally fixed to a point on the vehicle that is stationary relative to the vehicle so as to avoid the loss of calibration when the mirror is moved. Accordingly, the magnetic sensor must often be wired remotely from the electronics mounted on the adjustable rearview mirror. This remote wiring is not aesthetically pleasing and increases the complexity of packaging for the electronic compass. It would be preferable to bundle all of the electronics for an electronic compass, including its magnetic sensors and electronics, in the same package. Thus, there is a need in the art for an electronic compass having a moveable magnetic sensor which can maintain its calibration.

SUMMARY OF THE INVENTION

In accordance with the present invention, an electronic compass is equipped with magnetic sensor position instrumentation which allows the magnetic sensors of the electronic compass to be moved relative to the vehicle while maintaining its calibration.

The instrumentation informs the compass electronics of any movement of the magnetic sensors relative to the vehicle so that this movement may be factored into the electronic compass directional calibration.

The magnetic sensor and position instrumentation are physically integrated into the electronics package for the electronic compass of the present invention, allowing the electronic compass to be unitarily packaged. This unitary packaging improves the aesthetic appearance of the electronic compass and allows it to be easily mounted on the interior of a vehicle. The unitary packaging also allows the electronic compass to be easily retrofitted in the automotive aftermarket.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

The following description of the present invention is merely exemplary in nature and is in no way intended to limit the invention or its uses. Moreover, the following description, while depicting an electronic compass designed to operate with a vehicle, is intended to adequately teach one skilled in the art to make and use the electronic compass of the present invention in any compass application.

Figure 1:
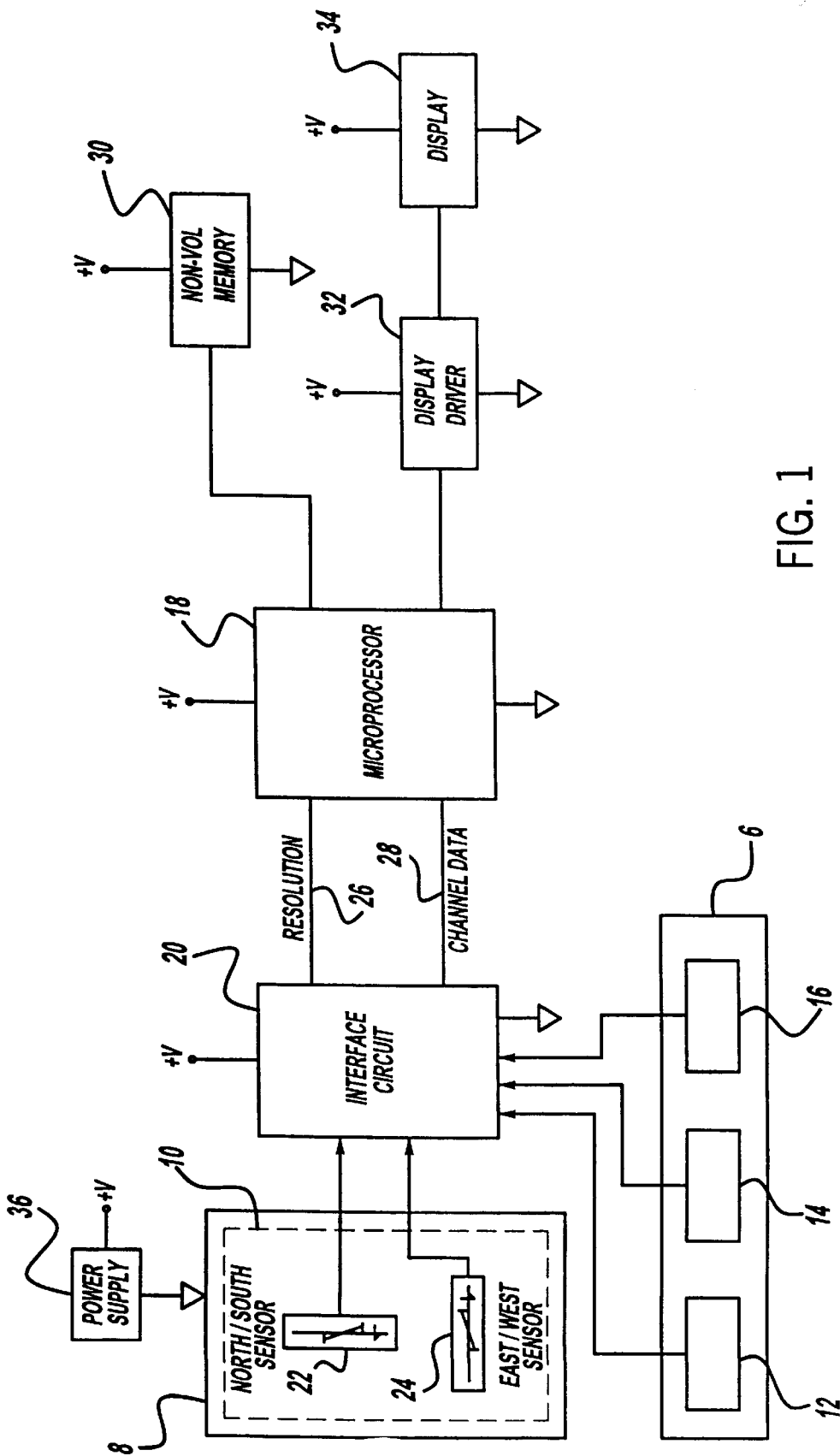
FIG. 1 is a block diagram of the electronic compass electrical circuit of the present invention.

Referring to FIG. 1, the compass system of the present invention includes a magnetic field sensor 10 packaged in a housing 8 and positions sensors 12, 14, and 16 of position sensor block 6 coupled to a microprocessor 18 through an electrical interface circuit 20. In the preferred embodiment, sensor 10 is comprised of individual sensors 22 and 24 which sense separate orthogonal components of the Earth's magnetic field, and microprocessor 18 is an HC05 8-bit microprocessor manufactured by Motorola. Microprocessor 18 and circuit 20 are coupled via serial communications lines 26 and 28, and comprise a processing circuit for processing electrical signals supplied from sensors 12, 14, 16, 22, and 24. Also coupled to microprocessor 18 is a nonvolatile memory circuit 30 for storing compass data, a display driver 32, and a display 34 for displaying heading information to the operator of the vehicle. Power supply circuit 36 provides operating voltage to the various electrical components of the compass system. The functioning and interconnection of these circuits is now described in greater detail.

Magnetic field sensors 22 and 24 sense the horizontal components of the magnetic field external to the vehicle. Sensor 24 senses the east/west or channel 1 components of the field, and sensor 22 senses the north/south or channel 2 components of the field. As is described below, the magnetic field sensed by sensor 22 is said to have a positive polarity if it is in the north direction, and is said to have a negative polarity if it is in the south direction. Similarly, the magnetic field sensed by sensor 24 is said to have a positive polarity if it is in the East direction, and is said to have a negative polarity if it is in the west direction. Although the reference to the sensing directions of the sensors as being north, south, east, and west is literally accurate only when the vehicle is travelling north, these relative terms referring to direction are utilized hereinafter to refer to the component directions of the sensed external magnetic field. For example, a sensor 22 is oriented to sense the component of the Earth's magnetic field existing along an axis corresponding to the vehicle's direction of travel and sensor 24 is oriented to sense the component existing in a direction perpendicular to the vehicle's direction of travel.

In a preferred embodiment, sensors 22 and 24 are magneto-inductive sensors, each having a wire-wound high magnetic permeability core constructed of Metals 2705M available from Allied Signal Corporation. Preferably the core has dimensions of 0.020 inches×0.600 inches×0.001 inches, and is wound with approximately 2000 turns of 41 gauge wire. Sensors 22 and 24 of the preferred embodiment serve as inductive elements in an oscillator circuit formed with portions of interface circuit 20, with the inductance of a particular sensor being dependent on the magnitude of the magnetic field in that sensor's direction of measurement. Through the generation of electrical signals having a frequency that varies with the external magnetic field, the vehicle direction can be ascertained. Although sensors 22 and 24 are magneto-inductive sensors in the preferred embodiment, other types of sensors, such as magnetoresistive sensors, can be implemented if appropriate changes are made to the compass system. In an alternate embodiment described below, sensors 22 and 24 may also be replaced by a flux gate sensor. Such magnetic sensors and their calibration and operation are also discussed in U.S. Pat. Nos. 4,953,305 and 5,878,370, both of which are expressly incorporated herein by reference in their entirety.

The position sensors 12, 14, 16 of sensor block 6 provide information regarding the relative position of the compass system in a vehicle. For example, if the compass system is packaged in an adjustable rearview mirror, sensors 12 and 14 provide tilt information on whether the mirror has been moved back and forth and/or side to side, and sensor 16 provides rotational information concerning the rotation of the rearview mirror. In one embodiment of the present invention, sensors 12 and 14 are potentiometers having a signal voltage which indicates whether the mirror has been tilted, although sensors 12 and 14 may comprise any sensor which indicates a change in mirror position such as a simple switch. Sensor 16 provides a continuous signal that represents the extent of the mirror rotation and enables the electronic compass to calculate the rotational offset of the rearview mirror from a previously calibrated position. Sensor 16 may be a rotational potentiometer, RVDT, optical encoder, or any other type of sensor which gives rotational position of the mirror. The position sensors 12, 14, and 16 of sensor block 6 provide the compass system with the capability to recalibrate the compass system if the magnetic field sensor 10 is moved. In a preferred embodiment, sensor block 6 is an optical sensor. More particularly sensor block 6 utilizes a photodetector and one or a plurality of light sources operated intermittently to generate positional information.

Figure 2A:
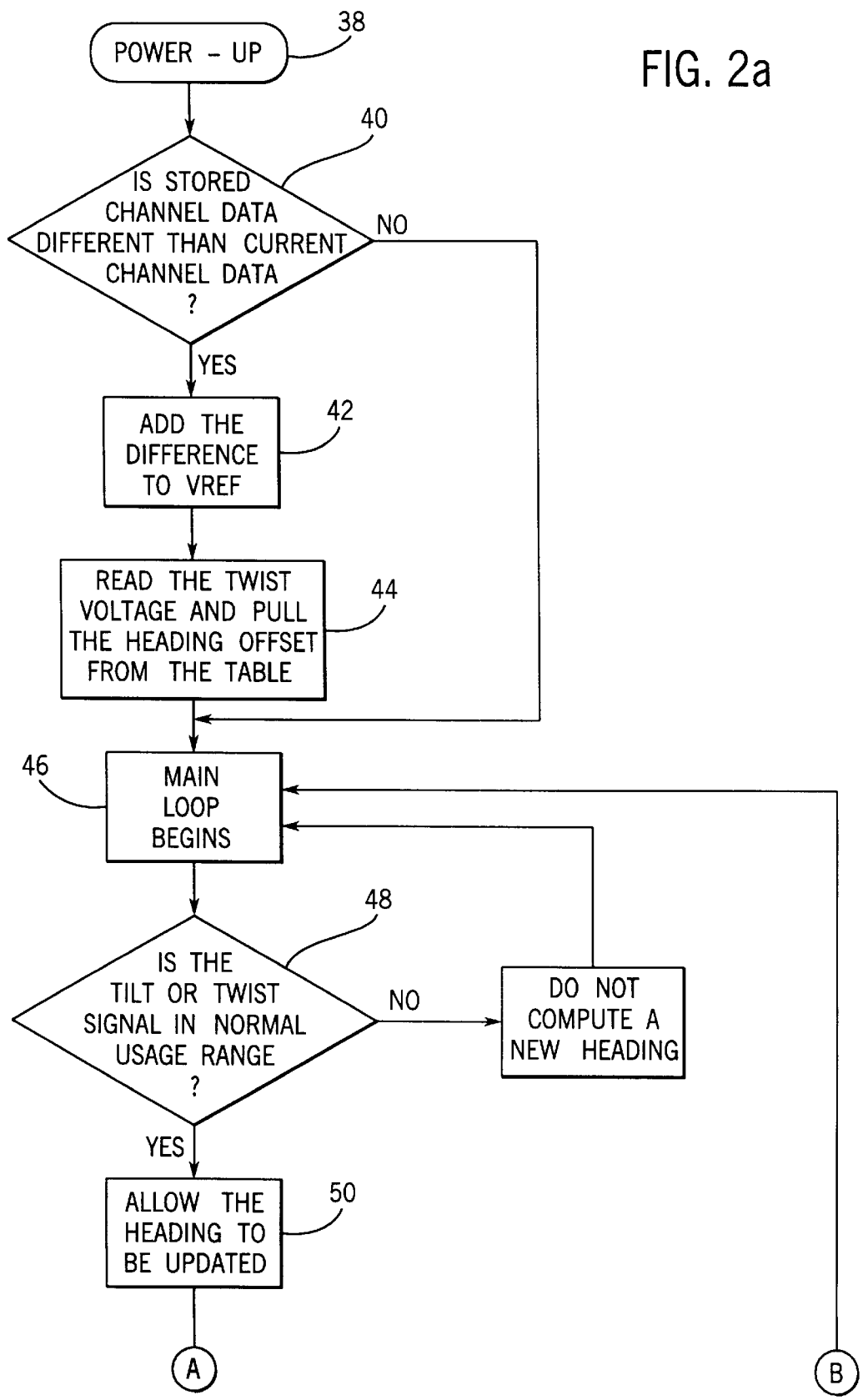
FIGS. 2a and 2b together represent a flow chart for the present invention which illustrates the calibration of the electronic compass.
Figure 2B:
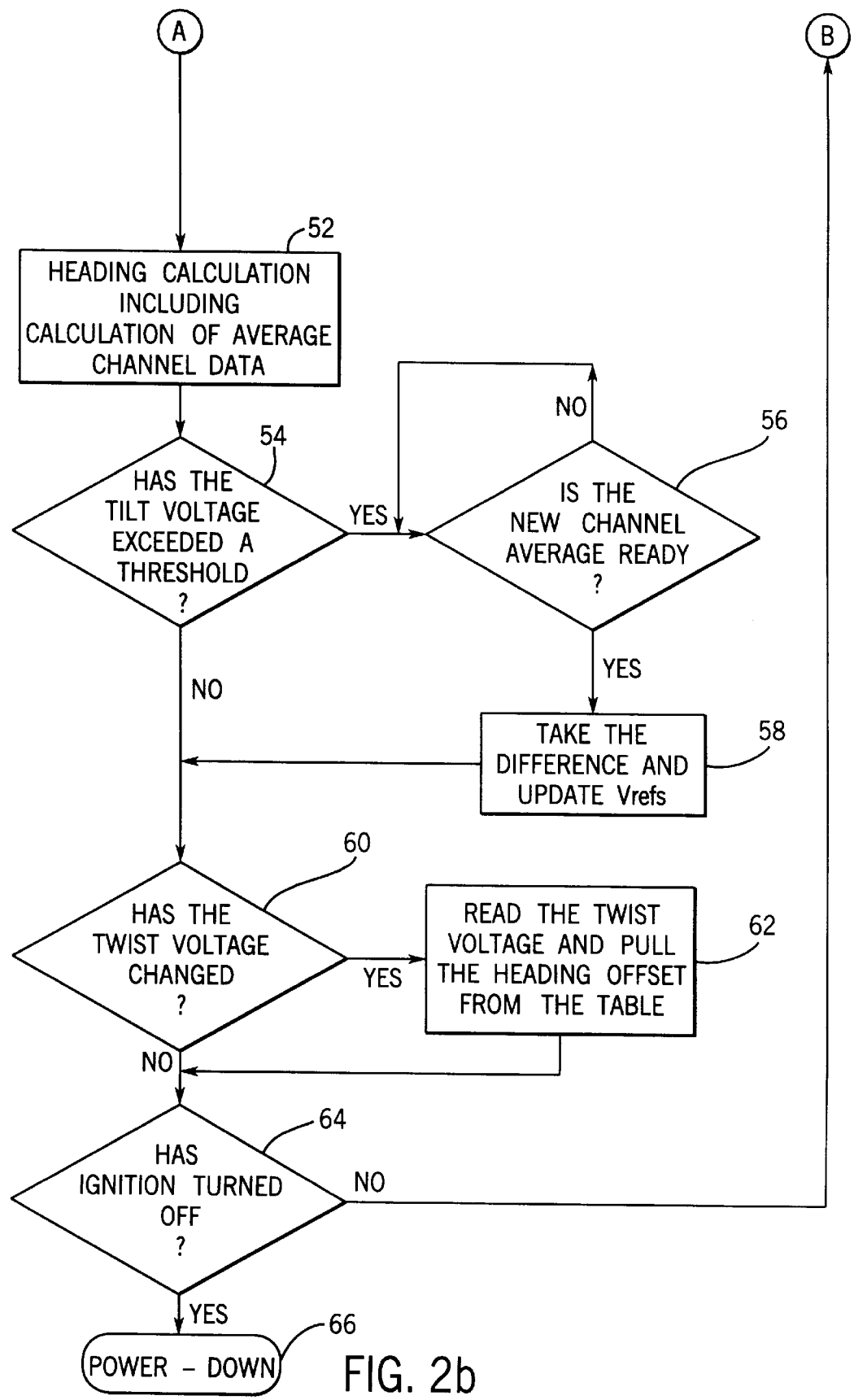

The flow chart of FIGS. 2a and 2b illustrate the calibration routine of the electronic compass using the positional sensor information output by sensor block 6, such as sensors 12, 14, and 16. The compass system is powered up at block 38, and the routine continues to block 40 while the stored channel data is compared to the current channel data provided by the sensors 22 and 24. If the stored channel data is different than the current channel data, then the difference is added to Vref at block 42 to compensate for movement of the housing 8 in normal operation or while the system is powered down. Continuing to block 44, the rotational or twist voltage is read from sensor 16, and a corresponding rotational offset angle based upon the twist voltage is pulled from a reference table. The reference table stored in non-volatile memory 30 correlates the amount of rotation or movement to calibration values for the compass to maintain the correct directional readings. Control then proceeds to block 46.

Returning to block 40, if the stored channel data is not different from the current data, then the main loop will begin at block 46. The tilt or twist signals or voltage from sensor block 6, such as from sensors 12, 14 and 16, will be analyzed at block 48 to determine if they are in the normal usage range. If the tilt or twist signals are not within the normal range, the routine will loop back to blocks 46–48 and a new heading will not be computed. This will address situations where the mirror housing has been moved for use by a passenger or otherwise displaced to where a driver could not use the mirror in its current position. If the tilt or twist signals are in the normal range (i.e., the normal position range of viewing for an adjustable rearview mirror), then the heading will be allowed to update at blocks 50 and 52. At block 50, the heading is updated, and at block 52, the heading and average channel data is calculated.

At block 54, the routine will check if the tilt sensors 12 and 14 voltages have exceeded a threshold voltage. If the tilt sensor 12 and 14 voltages have exceeded the threshold, then the routine at block 56 will wait until the new channel average is ready. When the new channel average is ready, the routine will continue to block 58 where the difference between the new and old channel averages will be taken and the reference voltages will be updated in accordance with the difference. If the new channel average is not ready, the routine will continue to loop at block 56. Returning to block 54 if the tilt potentiometer voltage does not exceed a predetermined threshold, control proceeds to block 60. Block 60 determines if the sensor 16 voltage has changed. If the sensor 16 voltage has been changed, the sensor 16 voltage will be read and a heading offset will be retrieved from the reference table at block 62. Control proceeds to block 64 which checks if the ignition has been turned off and then returns to block 46. If the ignition is off, the compass system will power down at block 66.

It is to be understood that the invention is not limited to the exact construction illustrated and described above, but that various changes and modifications may be made without departing from the spirit and scope of the present invention.

I claim:

1. A compass system, comprising:
   a housing, the housing supporting a compass unit;
   a position sensor, the position sensor determining displacement of the housing with respect to a generally horizontal plane, the sensor generating a displacement signal;
   a magnetic sensor, the magnetic sensor determining an orientation of the housing with respect to a magnetic field, the magnetic sensor generating a magnetic field signal;
   a compensation controller, the compensation controller varying the magnetic field signal by an offset; and
   an offset update circuit, the offset update circuit receiving the displacement signal and compensating for displacement of the housing by determining a first average magnetic field signal and comparing the first average magnetic field signal with a second average magnetic field signal generated prior to the first average magnetic field signal to define a difference signal, the difference signal being used to determine the offset.

2. The compass system of claim 1 wherein the position sensor is an optically triggered sensor.

3. The compass system of claim 1 further comprising a rotation sensor, the rotation sensor generating a rotation signal which varies in accordance with rotation of the housing about a generally vertical axis.

4. The compass system of claim 3 wherein the offset update circuit further includes a rotational update circuit receiving the rotation signal and determining a rotational offset, the rotational offset in part determining the offset.

5. The compass system of claim 3 wherein the position sensor and the rotation sensor are integral to form a composite sensor, and the composite sensor is optically triggered.

6. The compass system of claim 1 wherein the magnetic sensor determines the orientation of the housing with respect to the magnetic field of the earth.

7. The compass system of claim 1 wherein the magnetic sensor further comprises:

a first magnetic sensor for determining orientation of the compass unit with respect to a first magnetic axis; and a second magnetic sensor for determining orientation of the compass unit with respect to a second magnetic axis orthogonal to the first magnetic axis.

8. The compass system of claim 7 wherein the magnetic field is the magnetic field of the earth.

9. The compass system of claim 7 wherein the first axis is one of a north/south and east/west axis, and the second axis is the other of the north/south and east/west axis.

10. A compass system, comprising:

a housing, the housing supporting a compass unit;

a position sensor, the position sensor determining displacement of the housing with respect to a generally horizontal plane, the sensor generating a displacement signal;

a first magnetic sensor for determining orientation of the compass unit with respect to a first magnetic axis, the first magnetic sensor generating a first magnetic field signal;

a second magnetic sensor for determining orientation of the compass unit with respect to a second magnetic axis orthogonal to the first magnetic axis, the second magnetic sensor generating a second magnetic field signal, wherein the first and second magnetic field signals are combined to define a composite magnetic field signal;

a compensation controller, the compensation controller varying the composite magnetic field signal by an offset; and an offset update circuit, the offset update circuit receiving the displacement signal and compensating for displacement of the housing by determining a first average composite magnetic field signal and comparing the first average composite magnetic field signal with a second average composite magnetic field signal determined prior to the first average composite magnetic field signal to define a difference signal, the difference signal being used to determine the offset.

11. The compass system of claim 10 wherein the position sensor is an optically triggered sensor.

12. The compass system of claim 10 further comprising a rotation sensor, the rotation sensor generating a rotation signal which varies in accordance with rotation of the housing about a generally vertical axis.

13. The compass system of claim 12 wherein the offset update circuit further includes a rotational update circuit receiving the rotation signal and determining a rotational offset angle, the rotational offset angle in part determining the orientation of the housing.

14. The compass system of claim 13 wherein the position sensor and the rotation sensor are integral to form a composite sensor, and the composite sensor is optically triggered.

15. The compass system of claim 12 wherein the first and second magnetic sensors determine the orientation of the housing with respect to the magnetic field of the earth.

16. The compass system of claim 15 wherein the first axis is one of a north/south and east/west axis, and the second axis is the other of the north/south and east/west axis.

17. A method for compensating a compass mounted in a displaceable housing where displacement of the housing changes the orientation of the compass, comprising the step of:

determining if the housing has been tilted with respect to a horizontal plane;

determining a present magnetic orientation of the compass;

comparing the present magnetic orientation with a previous magnetic orientation to determine a difference between the present and previous magnetic orientations and generating an offset value; and updating a calibration value in accordance with the offset values.

18. The method of claim 17 further comprising the steps of:

determining if the compass housing has been rotationally displaced with respect to a generally vertical axis;

determining a rotational signal in accordance with an amount of rotation of the housing; and determining a rotational offset value compensating the magnetic heading in accordance with the rotational offset value.

19. A vehicle compass configured for mounting in an adjustable vehicle interior element comprising:

a magnetic field sensor configured to sense the Earth's magnetic field and to generate orientation signals representative of the orientation of the magnetic field sensor with respect to the Earth's magnetic field;

a position sensor configured to sense adjustments in the orientation of the magnetic field sensor as the vehicle interior element is adjusted and to generate position sensor signals; and a control circuit configured to receive the orientation signals and the position sensor signals and to generate heading signals based on the orientation signals and the position sensor signals.

20. The vehicle compass of claim 19 wherein the position sensor is configured to sense tilting adjustments of the magnetic field sensor.

21. The vehicle compass of claim 19 wherein the position sensor is configured to sense twisting adjustments of the magnetic field sensor.

22. The vehicle compass of claim 19 further comprising means for determining whether the position sensor signals are within a normal usage range.

23. The vehicle compass of claim 19 further comprising a reference table for use in generating the heading signals.

24. The vehicle compass of claim 19 wherein the position sensor is selected from a rotational potentiometer, an RVDT, an optical encoder, and an optical sensor.

25. The vehicle compass of claim 19 wherein the position sensor comprises a photodetector and at least one light source.

26. The vehicle compass of claim 19 wherein the position sensor is selected from a magneto-inductive sensor and a magneto-restrictive sensor.

27. The vehicle compass of claim 19 further comprising a display, wherein the display receives the heading signals and provides a display of the heading signals.

28. The vehicle compass of claim 19 wherein the position sensor is configured to sense adjustments in the position of an adjustable rearview mirror.

29. A method for calibrating a compass system having a magnetic field sensor coupled to an adjustable vehicle interior element comprising:

providing a magnetic field signal;

providing a displacement signal based on a displacement of the magnetic field sensor; and calculating a heading signal based on the magnetic field signal and the displacement signal.

30. The method of claim 29 wherein the displacement signal represents a tilting adjustment of the magnetic field sensor.

31. The method of claim 30 wherein the step of calculating a heading signal comprises receiving the displacement signal, determining a first magnetic orientation of the magnetic field sensor, and comparing the first magnetic orientation with a second magnetic field orientation of the magnetic field sensor determined prior to the first magnetic orientation.

32. The method of claim 29 wherein the displacement signal represents a twisting adjustment of the magnetic field sensor.

33. The method of claim 32 wherein the step of calculating a heading signal comprises receiving the displacement signal and retrieving a heading offset from a reference table.

34. The method of claim 29 further comprising determining whether the displacement signal is within a normal usage range.

35. The method of claim 29 wherein the magnetic field signal is based on an orientation of the magnetic field sensor with respect to a magnetic field.

36. The method of claim 35 wherein the magnetic field is a magnetic field of the Earth.

37. The method of claim 29 further comprising displaying the heading signal.

* * * * *